United States Patent [19]

Hinman, Jr. et al.

[11] 3,986,079

[45] Oct. 12, 1976

[54] OFFSET KEYING TECHNIQUE FOR SEGREGATED PHASE COMPARISON RELAYING

[75] Inventors: Walter L. Hinman, Jr., New Providence; Russell W. Gonnam, Morris Plains, both of N.J.

[73] Assignee: Westinghouse Electric Corporation, Pittsburgh, Pa.

[22] Filed: Feb. 7, 1975

[21] Appl. No.: 548,135

[52] U.S. Cl. .............................. 317/27 R; 317/28 R; 317/29 R; 317/47
[51] Int. Cl.² ...................... H02H 7/26; H02H 3/28
[58] Field of Search .............. 317/27 R, 28 R, 29 R, 317/47, 39; 328/133; 324/83 R, 83 D

[56] References Cited
UNITED STATES PATENTS

| | | | |
|---|---|---|---|
| 3,176,190 | 3/1965 | Hodges | 317/28 R |
| 3,295,019 | 12/1966 | Altfather | 317/28 R |
| 3,470,418 | 9/1969 | Hagberg et al. | 317/28 R X |
| 3,590,324 | 6/1971 | Rockefeller | 317/27 R X |
| 3,612,952 | 10/1971 | Hagberg | 317/27 R |
| 3,710,189 | 1/1973 | Hagberg | 317/27 R |
| 3,882,361 | 5/1975 | Hinman | 317/27 R |
| 3,893,008 | 7/1975 | Strickland, Jr. et al. | 317/27 R |

OTHER PUBLICATIONS

"Mitsubishi Denki Giho," by Mikami et al., pp. 1126–1140 of vol. 45, No. 9, (1971).

Primary Examiner—J D Miller
Assistant Examiner—Patrick R. Sole
Attorney, Agent, or Firm—S. A. Seinberg

[57] ABSTRACT

A phase comparison relaying network wherein a transmitter keying threshold is set at a predetermined value of the current wave at the transmitter end which is offset from the effective zero axis of the current wave. This yields a signal which, when phase compared with the current wave at the receiver end of the protected line section, permits a tripping response in the presence of "outfeed" current at the "weak feed" end of the protected line section which might occur during an internal fault.

8 Claims, 10 Drawing Figures

INTERNAL 10A HIGH RESISTANCE FAULT

FIG.6

0.5 AMP ERROR
EXTERNAL
FAULT

FIG. 7

INTERNAL FAULT
NO OUTFEED

FIG. 8
EXTERNAL FAULT

| TRUTH TABLE | | | |
|---|---|---|---|
| $I_{SWP}$ | $I_{SWN}$ | $RI_{SW}$ | TRIP |
| 1 | 0 | 1 | 1 |
| 0 | 1 | 0 | 1 |
| 0 | 1 | 1 | 0 |
| 1 | 0 | 0 | 0 |
| 0 | 0 | 0 | 0 |
| 0 | 0 | 1 | 0 |

FIG. 9
PRIOR ART
INTERNAL FAULT WITH OUTFEED

OFFSET KEYING TECHNIQUE FOR SEGREGATED PHASE COMPARISON RELAYING

BACKGROUND OF THE INVENTION

This invention relates to protective relaying apparatus of the type which phase compares the current quantities at the two end portions of a protected transmission line section and is particularly useful in the segregated phase comparing apparatus shown and described in U.S. Pat. Application Ser. No. 402,687, filed Oct. 2, 1973 (as a continuation of now abandoned application Ser. No. 295,031, filed Oct. 4, 1972) now U.S. Pat. No. 3,893,008, dated July 1, 1975. Other U.S. patent applications disclosing similar segregated phase comparing relaying apparatus are Ser. No. 382,791, filed July 26, 1973, now U.S. Pat. No. 3,882,361, dated May 6, 1975; Ser. No. 387,070, filed Aug. 9, 1973, now U.S. Pat. 3,832,601, dated Aug. 27, 1974; Ser. No. 392,691, filed August 29, 1973, now U.S. Pat. No. 3,898,531, dated Aug. 5, 1975; and Ser. No. 436,758, filed Jan. 25, 1974; now U.S. Pat. No. 3,832,601, dated Aug. 27, 1974. Normally, when a protected line section is faulted, fault current will flow inwardly to the fault from the energized busses. Under these conditions, the direction of the current at each end of the internally faulted line section will be the same. However, under certain internal fault conditions as, for example, in the case of a high resistance line-to-ground or line-to-line fault, this is not always true. For example, assuming a strong power supply bus at one end and a weak power supply bus supplying a load at the other end, it is possible to have a net "outfeed" from the line section into the weak bus so that the relaying apparatus would not recognize the internal fault and the opening of the breakers would have to be accomplished by back-up or secondary protection.

In accordance with the teachings of this invention, the offsetting of the keying threshold from the zero line of the current wave, permits the phase comparing apparatus to recognize an internal fault even though there is an "outfeed" into one of the busses.

DESCRIPTION OF THE PREFERRED EMBODIMENT

Figure 1:
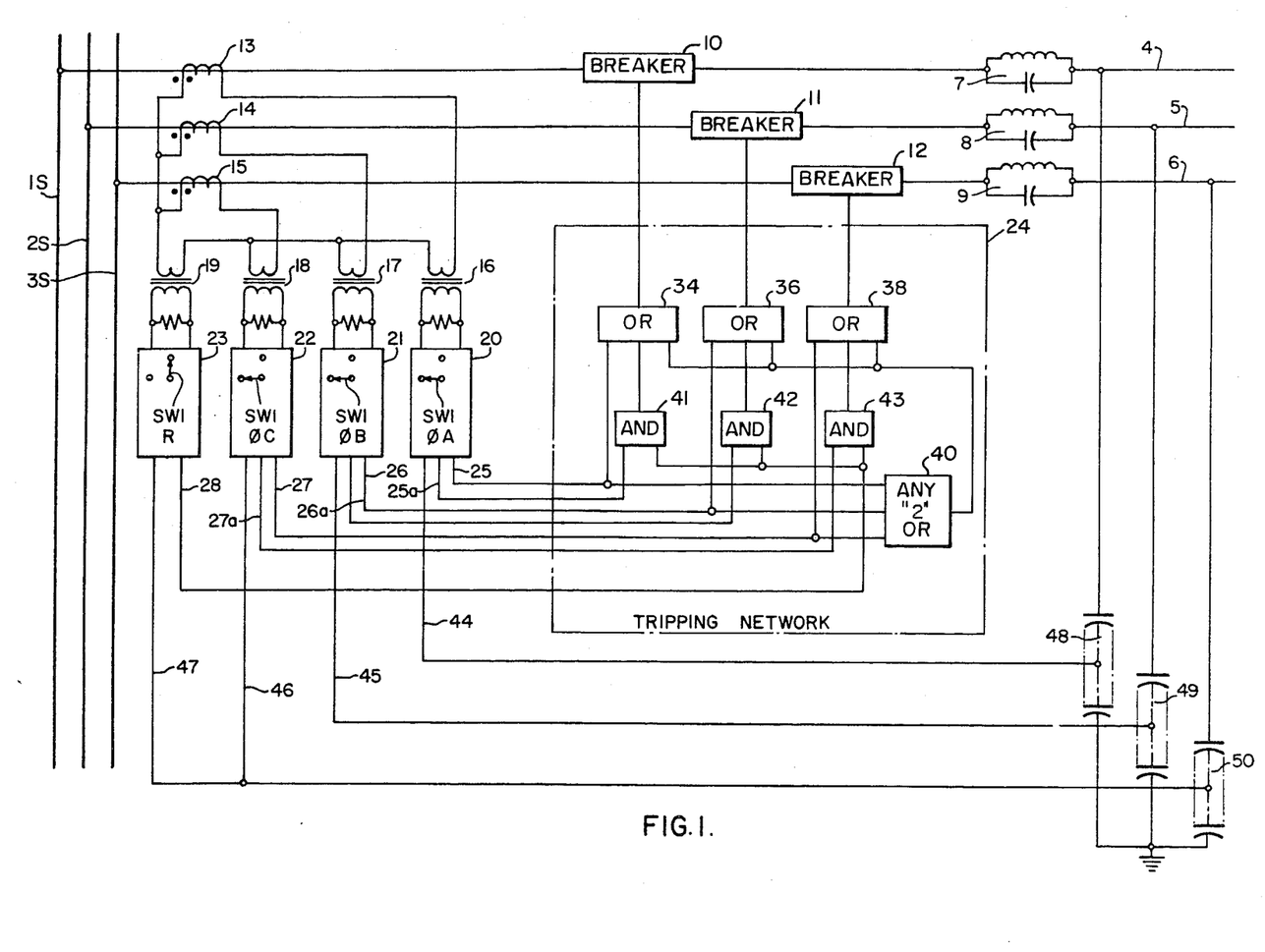
FIG. 1 is a block diagram illustrating one terminal of a segregated phase comparison relaying system of a protected line section.
Figure 2:
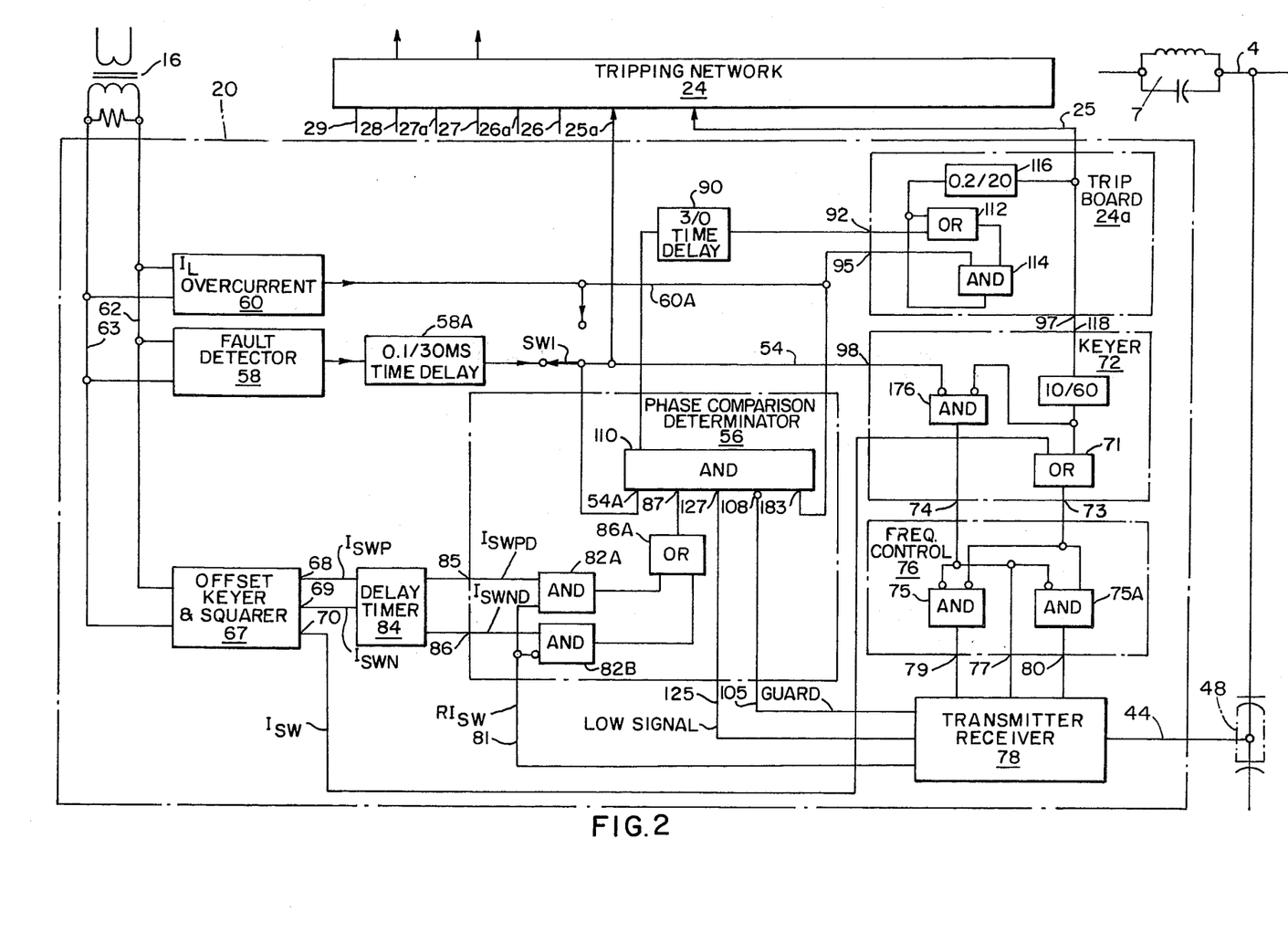
FIG. 2 is a more detailed block diagram showing the relaying apparatus which is associated with each of the three line conductors.
Figure 4:
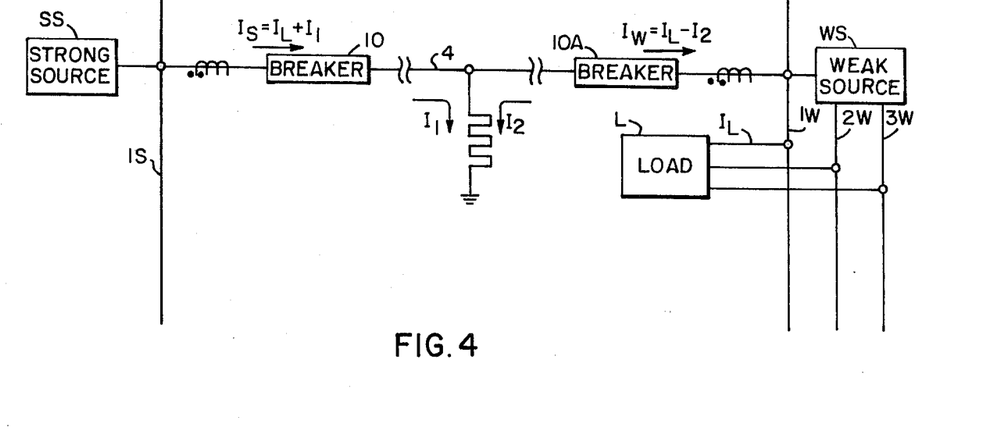
FIG. 4 schematically illustrates a protected section of a power line connected between a strong source and a weak source with an internal high resistance ground fault showing the current quantities flowing in the protected line section.

Referring to the drawings by characters of reference, the numerals 1S, 2S and 3S designate respectively the three busses at the strong feed end of a protected line section and which are supplied from a strong source SS. These busses 1S, 2S and 3S are connected to phase conductors 4, 5 and 6, respecitvely of the protected line section through line traps 7, 8 and 9 and breakers 10, 11 and 12. The conductors 4, 5 and 6 have their other end portions connected through breakers to busses 1W, 2W and 3W supplied with power from a weak source WS. FIG. 4 illustrates the manner in which one of the phase conductors 4 is connected through a breaker 10A to a remote bus 1W energized from a weak energy source WS. The busses 1W, 2W and 3W, energized from the weak source WS, in turn, energize a load L. It will be appreciated that the lines 5 and 6 are connected individually to the busses 2W and 3W through individual breakers, the showing of which has been eliminated in the interest of simplicity. The relaying apparatus located at each end of the phase conductors 4, 5 and 6 are identical and only the one adjacent the busses 1S, 2S and 3S is illustrated in FIG. 2. It should be understood that similar apparatus will be located adjacent the busses 1W, 2W and 3W.

Current transformers 13, 14 and 15 are associated respectively with the phase conductors 4, 5 and 6 and are connected through the isolating current transformers 16, 17 and 18 respectively to the phase relaying networks 20, 21 and 22. An isolating transformer 19 is connected to conduct the residual or ground current in the normal manner and it energizes the ground relaying network 23. The isolating transformers 16, 17, 18 and 19 energize loading resistors whereby voltage quantities are supplied to the networks 20, 21, 22 and 23 which have a magnitude that is proportional to the current in the conductors 4, 5 and 6 and the residual current respectively.

The networks 20, 21, 22 and 23 are identical except that the residual network 23 has its switch SW1 in a position such that the fault current is detected by the $I_L$ overcurrent network 60 rather than by the fault detector 58.

The networks 20, 21 and 22 are provided with output conductors 25, 26 and 27 respectively which normally provide logical O signals to the OR networks 34, 36 and 38 respectively. These OR networks are connected to actuate the breakers 10, 11 and 12 respectively. In the event of the faulting of one or more of the conductors 4, 5 and 6, the corresponding network will be actuated to cause its output conductor 25, 26 or 27, as the case may be, to cause one or more of the OR networks 34, 36 or 38 to supply a logical 1 signal to trip the proper one or ones of the breakers 10, 11 or 12. The output conductors 25, 26 and 27 are also connected to input terminals of an ANY "2" OR network 40, the output of which is connected to each of the OR networks 34, 36 and 38. Therefore, in the event of the faulting of two or more of the conductors 4, 5 and 6, all of the breakers 10, 11 and 12 will be actuated to disconnect the conductors from the busses 1S, 2S and 3S.

The networks 20, 21 and 22 are also provided with output conductors 25a, 26a and 27a respectively which are connected to a first input of AND networks 41, 42 and 43 respectively. The second inputs of the AND networks 41, 42 and 43 are connected together to the output conductor 28 of the network 23. As will be described in greater detail below, the detection of a ground or residual current fault by the network 23 provides a logical 1 signal on the conducter 28 and to the second input of each of the AND networks 41, 42 and 43. In the event a ground current fault occurs, one of the networks 20, 21 and 22 will also energize its output conductor 25a, 26a or 27a with a logical 1 signal and one of the AND networks 41, 42 and 43 will supply a logical 1 signal to one of the OR networks 34, 36 and 38 whereby one of the breakers 10, 11 and 12 will be energized to disconnect the faulted one of the conductors 4, 5 and 6.

The network 20 is more completely shown in FIG. 2 and includes a fault detector 58 which provides a logical 1 output signal when it detects a fault on the conductor 4. This fault detector may take any of various forms, one of which may be the fault detector shown and described in U.S. Pat. No. 3,654,516, dated Apr. 4, 1972 to M. Traversi. The output of the fault detector 58 is connected through a time delay 58A and conductor 54 to one terminal 54A of an AND network 110 (the switch SW1 being in its illustrated position) and provides a first enabling signal to the AND network 110.

An $I_L$ overcurrent network 60 energized from the busses 62 and 63 is connected by a conductor 60A to a second input terminal 183 of the AND network 110. The overcurrent network 60 may take any desired form in which a logical 1 signal will be provided whenever the input signal from the busses 62 and 63 represents a line current greater than a predetermined minimum current which, for example, may be the maximum expected charging current of the conductor 4. The conductor 60A is also connected to the input terminal 95 of the trip board 24a and therefrom to one input terminal of its AND network 114. The output terminal of the AND network 114 is connected through a timer 116 to the output conductor 25. With this arrangement, the trip board 24a can never supply a tripping signal to the tripping network 24 unless and until the $I_l$ overcurrent network 60 supplies a logical 1 signal.

The transmitter receiver 78, when it is receiving a signal from the remote transmitter-receiver of at least the proper magnitude, provides a logical 1 signal to its output conductor 125 which is applied to a third input terminal 127 of the AND network 110. If the transmitter-receiver 78 fails to receive a signal of sufficient strength, the resulting logical 0 signal on the input terminal 127 will prevent a logical 1 signal at the output of the AND network 110. When the transmitter-receiver 78 is receiving a guard signal from the remote transmitter-receiver, a logical 1 signal will be supplied to its output conductor 105 and thereby to the NOT input terminal 108 of the AND network 110. The AND network 110 will be enabled to provide an output signal solely in the absence of the reception of a guard signal by the transmitter-receiver 78.

Figure 3:
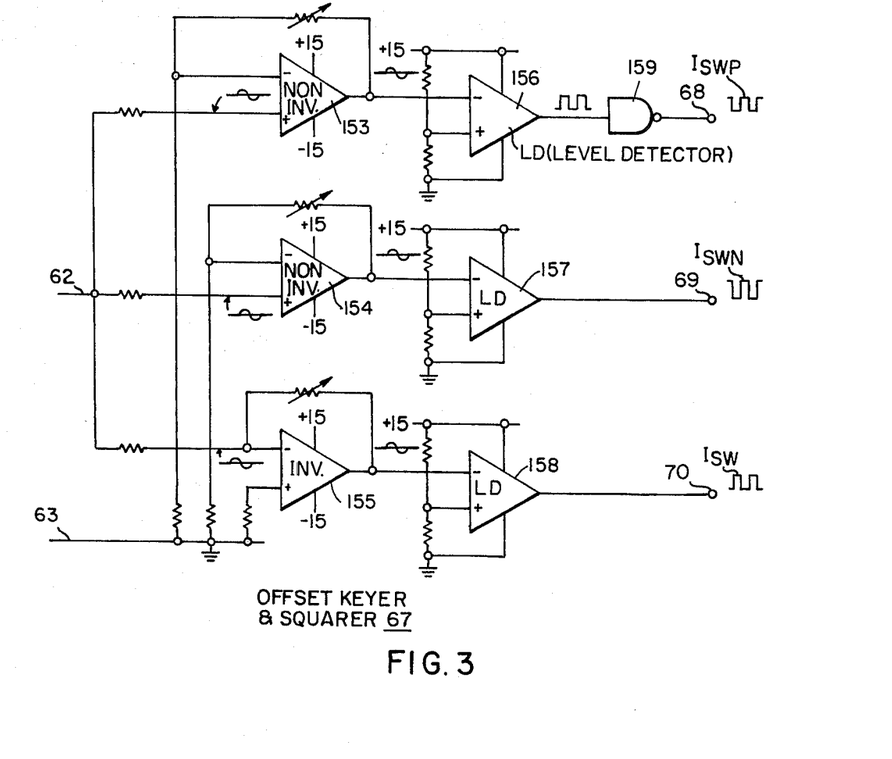
FIG. 3 is a block diagram of the offset keyer and squarer of FIG. 2.

Under normal non-fault conditions, no $RI_{SW}$ signal will be supplied by the transmitter-receiver 78 over its output conductor 81 to the normal and NOT input terminals of the AND networks 82A and 82B respectively. The $RI_{SW}$ signal comprises a series of alternating logical 1 and 0 signals indicating the instantaneous magnitude of the current in line 4 at the remote location with reference to the keying magnitude. The And networks 82A and 82B serve as current comparison devices for comparing the relative magnitude of the current at the remote end of the line as supplied to the conductor 81 with the relative magnitude of the current square waves derived from the current supplied locally through the transformer 16 to the offset keyer and squarer network 67, more fully as shown in FIG. 3. For the present it is sufficient to state that a logical 1 signal will be supplied to its output conductor 68 during selected portions of the positive half-cycle of the signal between the busses 62 and 63 and a logical 0 signal will be supplied at its output conductor 69 during at least a portion of the positive half-cycle of the quantity between the conductors 62 and 63. These output signals are delayed in the usual manner by the delay timer 84 and are provided to the input terminals 85 and 86 of the phase comparison determinator 56 and therefrom to the normal input terminals of the AND networks 82A and 82B respectively.

When logical 1 signals are supplied concurrently to both of the input terminals of the AND network 82A, the OR network 86A will provide a logical 1 signal to the input terminal 87 of the AND network 110. Similarly, when a logical 1 signal is supplied to the terminal 86 and a logical 0 signal is supplied concurrently by the conductor 81 to the AND network 82B, a logical 1 output signal will also be supplied to the OR network 86A which provides a logical 1 signal to the input terminal 87. Since the absence of a $Ri_{SW}$ signal is a logical 0 signal, the AND network 82B will periodically provide logical 1 signals to the OR network 86A and thereby to the input terminal 87 of the AND network 110. However, in the absence of an enabling logical 1 signal at the input terminal 54A. and/or the presence of a logical 1 guard signal at the NOT input terminal 108, the AND network 110 remains ineffective to provide any logical 1 output signals to the delay timer 90 to initiate its timing. The offset keyer and squarer 67 provides a $I_{SW}$ signal on its output condutor 70 and therefrom to one input terminal of an OR network 71 of the keyer 72. This $I_{SW}$ signal comprises a series of logical 1 and logical 0 signals as determined by the magnitude of the current signal supplied by the transformer 16 as compared to the keying magnitude.

In the absence of a fault, a logical 0 signal will be supplied over the conductor 54 to the input terminal 98 of the keyer 72 and therefrom to a first NOT input terminal of the AND network 176. The other NOT input terminal of the AND network 176 is connected to the output of the 10/16 timer which normally provides a logical 0 signal. The AND network 176, during non-fault operation, therefore provides a logical 1 signal through the output conductor 74 to NOT input terminals of the AND networks 75 and 75A of the frequency control 76. This logical 1 signal disables both of the AND networks 75 and 75A so that during normal operation logical 0 output signals are supplied by the conductors 79 and 80 to the transmitter-receiver 78. The logical 1 signal, normally supplied by the AND network 176, is conducted by output conductor 77 of the frequency control 76 to the transmitter-receiver 78.

The transmitter-receiver 78 may take any form in which it will transmit a guard signal in response to a logical 1 input signal on the conductor 77 also will supply trip-positive and trip-negative signals in response to the alternating logical 1 and logical 0 signals on the conductors 79 and 80 which occurs when a logical 0 signal is supplied to the output conductor 77 from the AND network 176.

When a fault occurs on the conductor 4, a logical 1 signal will be supplied by the fault detector 58 to the input terminal 54A of the AND network 110 and to the input terminal 98 of the keyer 72. When this occurs, the AND network 176 provides a logical 0 signal to the conductor 77 and to the NOT input terminals of the AND networks 75 and 75A. At this same time, the $I_{SW}$ signal will be supplied to the OR network 71 and the output conductor 73 of the keyer 72 will provide a series of logical 1 and logical 0 signals to the second NOT input terminal of the AND network 75 and to the normal input terminal of the AND network 75A whereby the output conductors 79 and 80 will be sequentially energized by logical 1 and logical 0 signals. This coupled with the logical 0 signal on conductor 77 causes the transmitter 78 to transmit the trip-positive and the trip-negative signals to the transmitter receiver at the remote busses.

Assuming that the network at the remote location has detected the fault, and has interrupted its transmission of the guard signal and is transmitting its $RI_{SW}$ signal, the transmitter-receiver 78 will supply a logical 0 signal to the NOT input terminal 108 of the AND network 110. Further assuming that the received signal is of sufficient strength, a logical 1 signal will be supplied to the input terminal 127 of the AND network 110 and alternating logical 1 and logical 0 signals representing the quantity $RI_{SW}$ will be supplied to the AND networks 82A and 82B. If the fault is internal to the protected line section, the logical 1 signal of the $RI_{SW}$ quantity will occur concurrently with the logical 1 signal of the $I_{SWPD}$ quantity and the logical 1 output signals from the AND networks 82A and 82B are supplied to the OR network 86A and thereby to the input terminal 87 of the AND network 110. The AND network 110 being satisfied supplies a logical 1 input signal to the time delay 90 which immediately commences to time out.

If the logical 1 signal exists for at least the 3 m.s. timing period, a logical 1 signal will be supplied by the time delay 90 through the input terminal 92 of the trip board 24a to one input terminal of the OR network 112. The resulting logical 1 output of the OR network 112 is supplied to the second input terminal of the AND network 114 which, because of the logical 1 signal being supplied to the network 60, will supply a logical 1 input signal to the other input terminal of the OR network 112 to maintain the AND network 114 effective to continue logical 1 output to the input of the 0.2/20 m.s. timer 116. When the timer 116 times out, it supplies a logical 1 signal to the output conductor 25. As discussed above and as will be apparent from FIG. 1, this logical 1 output signal is supplied to the OR network 34 which thereupon supplies a logical 1 or tripping signal to the breaker 10 causing the breaker 10 to open and disconnect the conductor 4 from the bus 1S.

If the fault which occurred is a phase to ground fault, the network 23 which has its switch SW1 connected to utilize its $I_L$ overcurrent network 60 as a fault detector, would likewise "see" the fault and would apply a logical 1 output signal via its conductor 28 (which is equivalent to the conductor 25 of the network 20) to each of the AND networks 41, 42 and 43. With a phase A to ground fault, only the conductors 25a and 28 will have a logical 1 output signal and only the AND network 41 will provide a logical 1 signal to the OR network 34 which serves as a backup arrangement for tripping the breaker 10.

Assuming a phase A to phase B fault, the network 21 and the network 20, would "see" the fault and place logical 1 output signals on output conductors 25, 25a, 26 and 26a. The logical 1 output signal on conductor 26 supplies a logical 1 input signal to the OR network 36 which thereupon supplies a logical 1 signal to trip the breaker 11 and the logical 1 signal on conductor 25 trips the breaker 10 as described. The breakers 10 and 11 are now actuated to disconnect the phase conductors 4 and 5.

The conductors 25 and 26 are also connected to the ANY "2" OR network 40 which is effective when two logical 1 input signals are supplied thereto to supply a logical 1 output signal to each of the OR networks 34, 36 and 38 whereby the breaker 12 is tripped, as well as the breakers 10 and 11. This actuation of the breaker 12, even though the line 6 is not faulted, is usually desirable to maintain system stability.

Thus far discussed, the operation is substantially identical to that described in the said copending application Ser. No. 402,687. In the apparatus of the said copending application, if the pulse currents at the two ends of the line section did not both flow into the line section or if the flow was outwardly of the protected line section even for the 3 m.s. time delay of the timer 90, no logical 1 output tripping signal would be supplied to the input terminal 92 of the trip board 24a and no tripping of the breakers would occur because the phase comparison determination 56 would not recognize the fault as the internal to the protected line section but would believe it to be external to the line section.

As is illustrated more particularly in FIG. 4, if the fault is a relatively high resistance single line to ground fault, and the bus $I_S$ is supplied from a strong source of power and the bus $I_W$ is supplied from a weak source of power and a load of $I_L$ amperes is supplied from the bus 1W, current $I_S$ flows from the bus 1S through the breaker 10 of a magnitude equal to $I_L + I_1$, where $I_1$ is the portion of the fault current which is supplied by the bus 1S. The current flowing through the breaker 10a will be equal to $I_W$, which is equal to $I_L - I_2$, where $I_2$ is the portion of the fault current supplied by the bus 1W. Under the assumed conditions, the magnitude of the current quantity $I_L$ is greater than the magnitude of the current quantity $I_2$ so that the current $I_W$ flows through the breaker 10A to the bus 1W.

Figure 5:
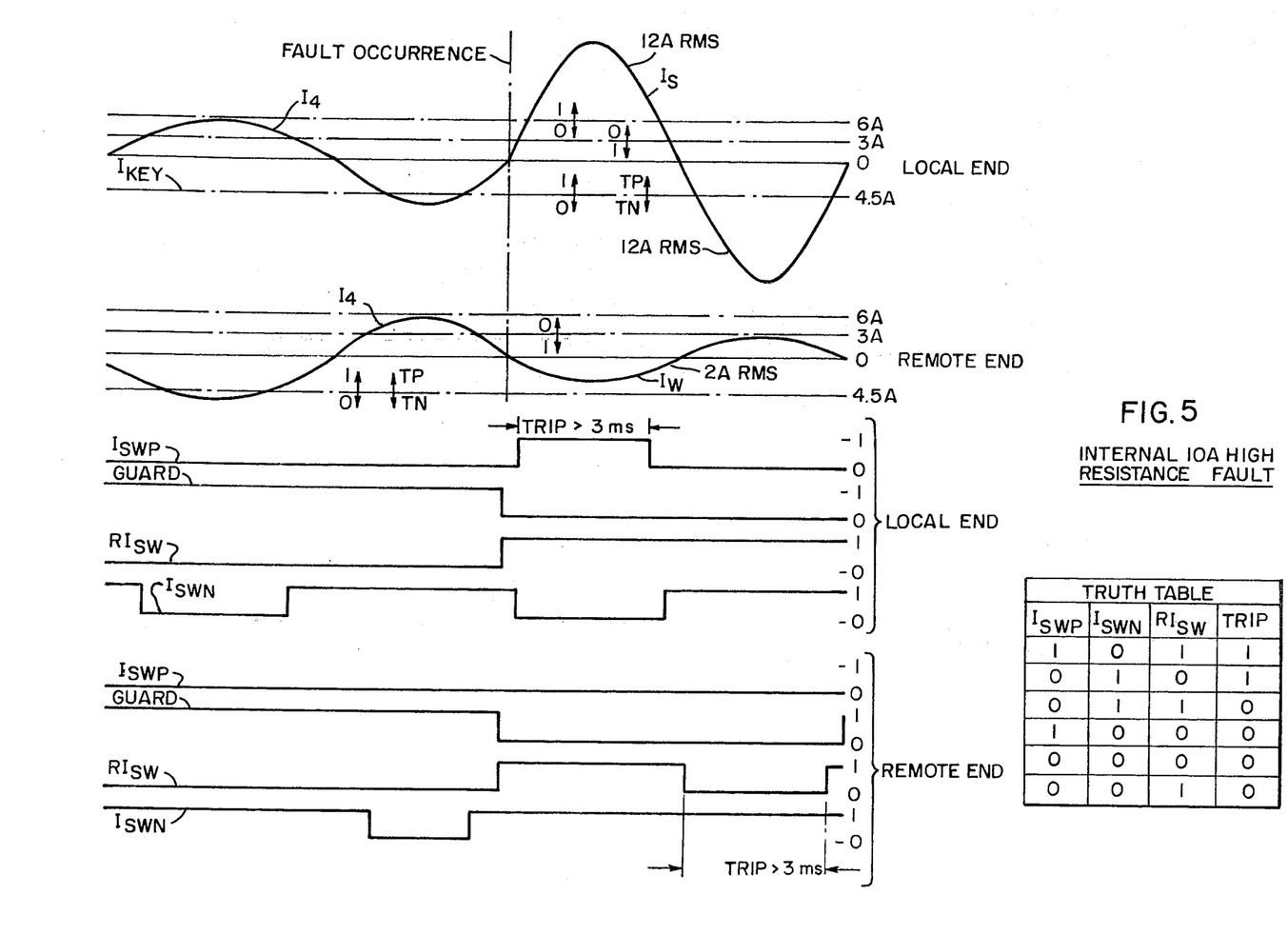
FIGS. 5, 6, 7 and 8 are curves showing the operating characteristics of a phase comparison relay embodying the invention.
Figure 9:
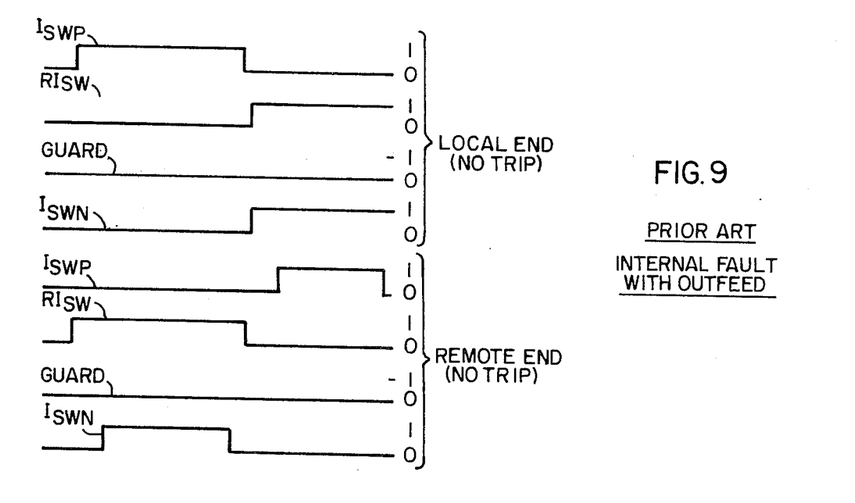
FIG. 9 is a view based on the current conditions shown in FIG. 5, but utilizing the phase comparison techniques of the prior art; and, FIG. 10 is a block diagram similar to FIG. 1, but illustrating a modified current sensing means.

Under the prior art condition in which the transmitter is keyed at substantially the 0° and 180° points of the current wave and the $I_{SWP}$ and $I_{SWN}$ pulses are initiated at 1.5 amps positive and 1.5 amps negative respectively, the values of $RI_{SW}$, $I_{SWP}$ and $I_{SWN}$ will be as illustrated in FIG. 9. Since neither of the AND networks 82A or 82B will provide logical 1 output signals, no logical 1 input signal will be supplied to the input terminal 87 of the AND network 110. In this regard, it should be noted that for AND network 82A to provide a logical 1 output signal, logical 1 signals must concurrently be applied by $I_{SWP}$ and $RI_{SW}$. In order to have a logical 1 output signal from AND network 82B, a logical 0 and logical 1 signal must be applied thereto by the $RI_{SW}$ and the $I_{SWN}$ quantities. It will be apparent from FIG. 9 that this does not occur. In accordance with the present invention (FIG. 5), the keying signal and the $I_{SWP}$ and $I_{SWN}$ are non-symmetrical. As illustrated, the keying signal occurs at −4.5 amperes while the $I_{SWP}$ and $I_{SWN}$ conditions occurs at +6.0 amperes and +3.0 amperes respectively. The current values as used herein are the output values of the transformers 16-18 on the basis that 5 amperes represents the full load current of the transmission line. Under the conditions as shown in FIG. 5, and with a fault occurring at the 0° point in the current wave 14, the AND network 82A will shortly provide a logical 1 output signal, because logical 1 signals are being supplied by both the $RI_{SW}$ and the $I_{SWP}$ quantities. Assuming a 60 Hz current, it will be apparent that the logical 1 output signal from the AND network 82A will remain for substantially more than 3 m.s. and a tripping signal will be provided by the time delay 90 to the trip board 24a, which will thereupon trip the breaker 10 as described above.

As illustrated in FIG. 5, the fault occurred at the 0° point of the current wave $1_4$, however, if the fault occurred at the 180° point, the proper phase comparison would not occur until after the next succeeding 0° point and a lapse of some 8 m.s. would occur before the time delay 90 would start to time out. While this is true for the network 20, it should be noted that since the magnitude and phase of the current signal supplied to the network 23 is equal and opposite to that supplied to the network 20, tripping under these conditions would be in response to the logical 1 output signal on the conductor 28. Similarly, if the fault was a high resistance phase A to phase B fault, the fault current in one of the faulted conductors is 180° out of phase with the fault current in the other of the conductors, and tripping would likewise occur as described above.

Figure 6:
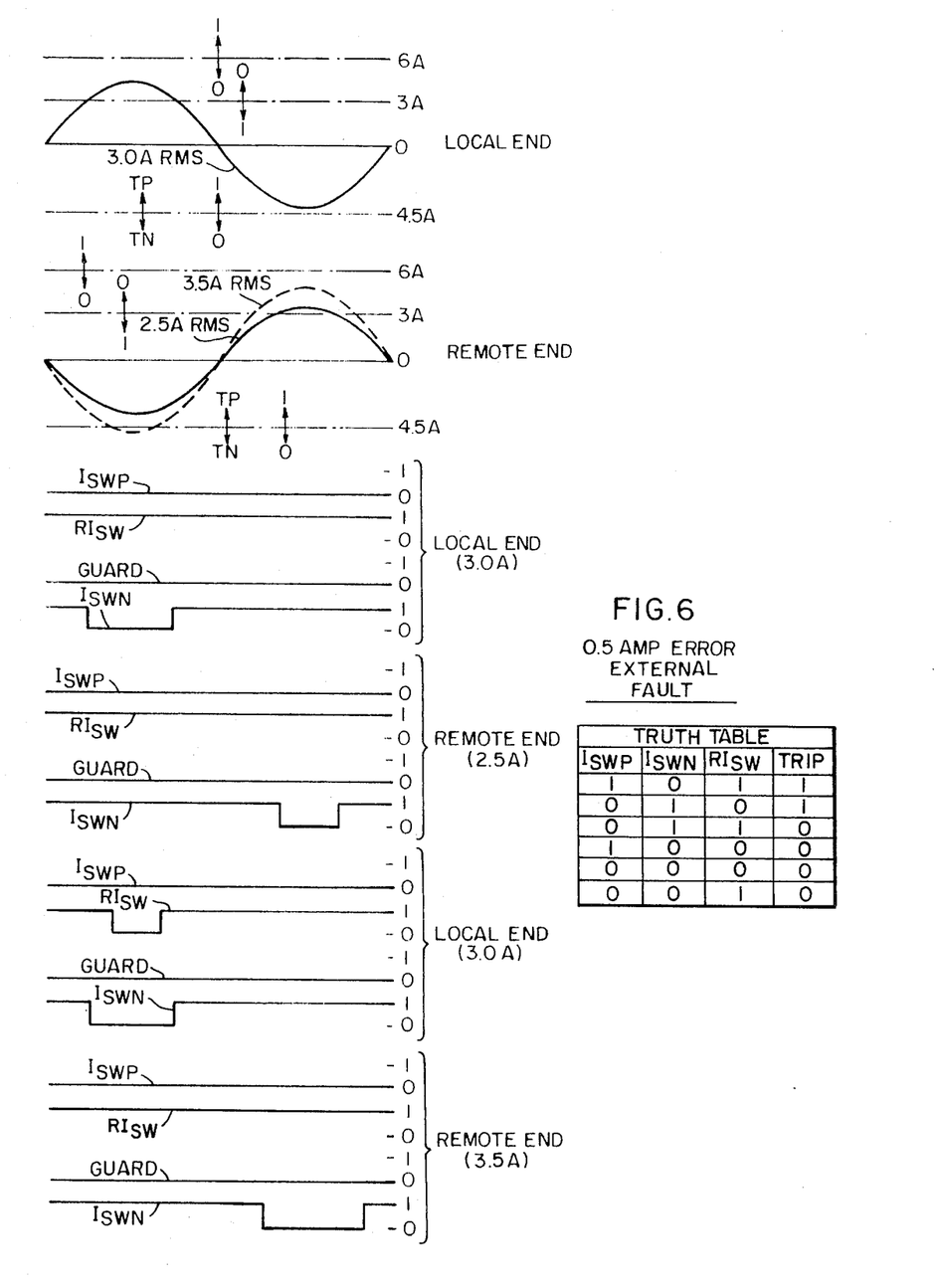
Figure 7:
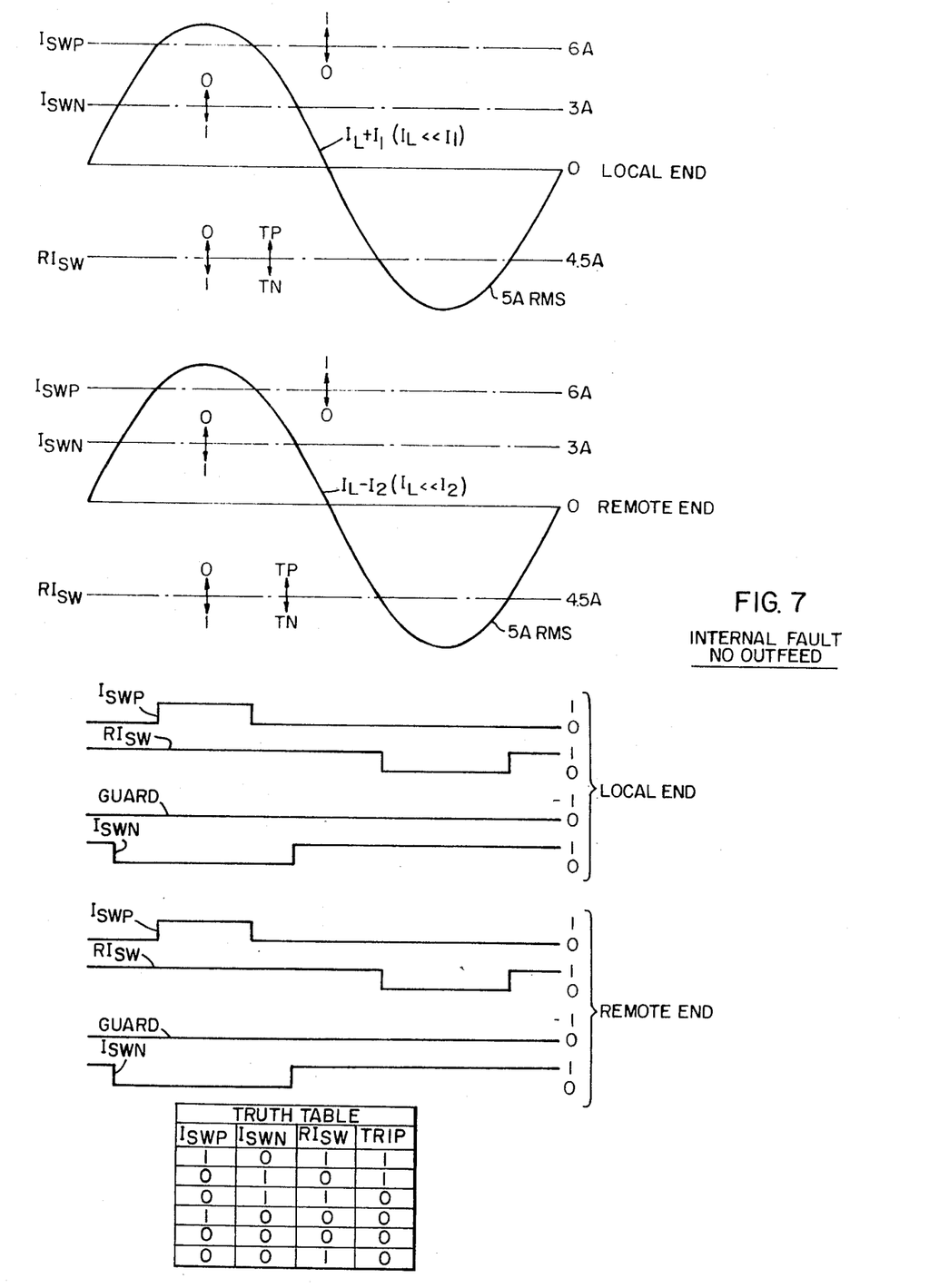

FIG. 6 illustrates the relationship of the $I_{SWP}$, $I_{SWN}$ and $RI_{SW}$ signals at the local end of the transmission lines for an external fault current of 3 amperes as measured in one conductor at the local end and further illustrates the relationship of these same signals at the remote end with assumed current errors of ± 0.5 amperes. It illustrates the fact that the breakers controlled thereby will not be tripped. FIG. 7 illustrates the relationships of $I_{SWP}$, $I_{SWN}$ and $RI_{SW}$ at the two ends of a transmission line during an internal fault in which 5 amperes is flowing at both ends of the protected conductor. It illustrates the fact that the breakers controlled thereby will be opened to clear the fault.

The selections of the current values at which the logical output signals of the quantities $I_{SWP}$, $I_{SWN}$ and $RI_{SW}$ change from 0 to 1 and vice versa may best be understood by referring to FIG. 5. It has been assumed that the maximum "outfeed" current $I_W$ under fault conditions will be 2 amperes RMS. In order to obtain a breaker tripping signal (see truth table), one of two conditions as set forth in the truth table must exist for at least the timing out interval (3m.s.) of the timer 90. At the local end, the current $I_S$ during the positive half-cycle is of ample magnitude to cause the quantity $I_{SWP}$ to be a logical 1 signal. Under "outfeed" fault conditions, the $RI_{SW}$ quantity must also be a logical 1 signal. The $RI_{SW}$ quantity is a logical 1 signal whenever the magnitude of the current $I_W$ is more positive than a predetermined design magnitude at which the $RI_{SW}$, changes to a logical 0 signal. With the assumed RMS magnitude of 2 amperes, the maximum magnitude will be appoximately 2.8 amperes. The design magnitude for $RI_{SW}$ should therefore be negative and greater than 2.8 amperes. This will, as illustrated, concurrently provide logical 1 signals for the quantities $I_{SWP}$ and $RI_{SW}$ for at least the 3 m.s. interval and the associated breaker will trip.

At the remote end, the current $I_W$ "outfeed" is small for the assumed conditions and the tripping is accomplished by the $I_{SWN}$ and $RI_{SW}$ quantities. For security reasons, the time delay of the timer 90 has been selected to be 3 m.s. The quantity $I_{SWN}$ should maintain a logical 1 signal and the quantity $RI_{SW}$ maintain a logical 0 signal for at least 3 m.s. and preferable somewhat longer as, for example, 3.3 m.s. The $RI_{SW}$ quantity is a logical 0 signal when the magnitude of the current $I_W$ is above its design magnitude and this will be throughout the the fault period.

The current $I_W$ will be positive and of a maximum magnitude of approximately 2.8 amperes and since the quantity $I_{SWN}$ is a logical 1 signal only when the magnitude of $I_S$ is less than a predetermined selected value, this selected value is choosen as 3 amperes. This assures that the quantity $RI_{SW}$ will be a logical 0 and, concurrently, that the quantity $I_{SWN}$ will be a logical 1 for a sufficient time interval to time out the time delay 90 and trip the breaker at the weak end.

Figure 8:
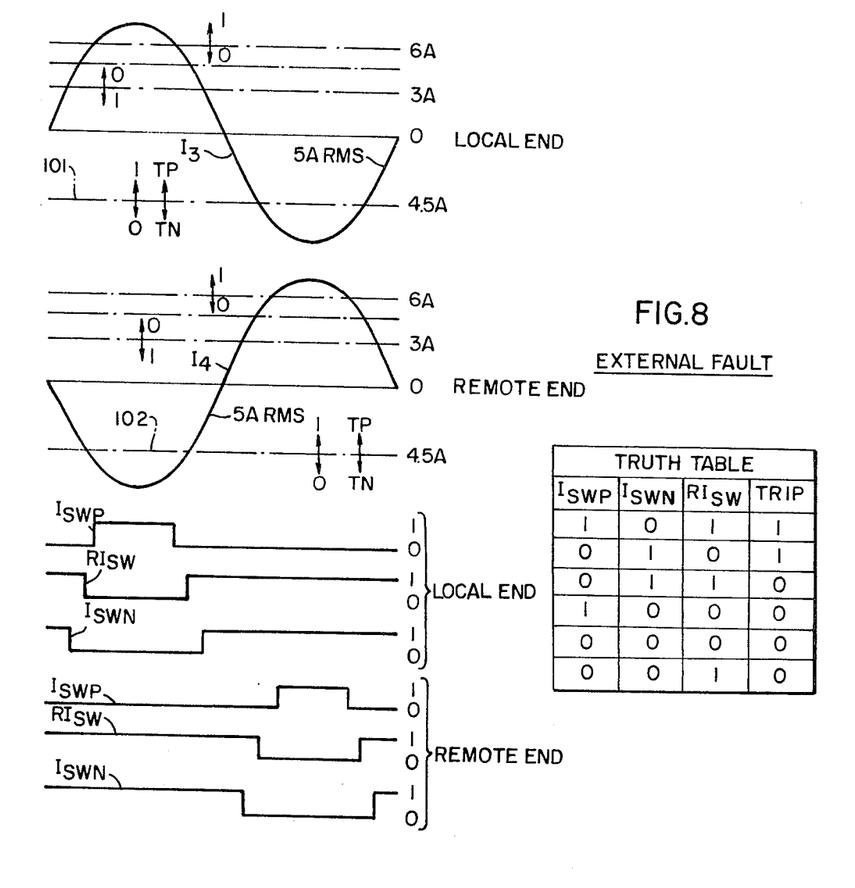

The selection of the magnitude at which the quantity $I_{SWP}$ changes from a logical 0 to a logical 1 signal may best be understood by referring to FIG. 8. It must be such that neither of the AND networks 82A and 82B will supply logical 1 output signals of sufficient duration to time out the delay 90. The phase and magnitude of the current $I_3$ and $I_4$ at the local and remote ends of the conductor during an external fault may not be exactly as illustrated in FIG. 8 and therefore it becomes desirable at the local end to have the quantity $RI_{SW}$ establish its logical 0 signal well ahead of the quantity $I_{SWN}$ establishing its logical 1 signal and vice versa.

During an external fault, the current at the two ends of the line are, except for the error discussed in connection with FIG. 6, equal as illustrated in FIG. 8. Therefore, the magnitude of the current $I_3$ at the local end, when the local $RI_{SW}$ quantity changes from a logical 1 to a logical 0 signal, will be as illustrated by the horizontal dotted line 101 through the local current wave $I_3$. Similarly, the magnitude of the current $I_4$ at the remote end when the remote $RI_{SW}$ quantity changes from a logical 0 to a logical 1 signal, will be as illustrated by the horizontal the dotted line 102 through the remote current wave $I_4$.

During the positive half-cycle of the current $I_3$, it is desirable to delay the changing of the $I_{SWP}$ quantity to a logical 1 signal for a suitable time interval. This time interval (which is not of a fixed magnitude) is obtained by choosing the difference in magnitude of the current $I_3$ between that at the time the $RI_{SW}$ quantity became a logical 0 signal and that at the time the $I_{SWP}$ quantity became a logical 1 signal. Similarly, during the positive half-cycle of the current $I_4$ the time (not fixed) interval between the time the remote $RI_{SW}$ quantity became a logical 1 signal and the time the remote $I_{SWN}$ quantity became a logical 1 signal is establisehd by the difference in magnitude of the current $I_4$. A suitable current change is 1.5 amperes and is referred to a current margin of safety.

In the case of the external fault (FIG. 8), it is desirable that the local $I_{SWN}$ quantity changes from its logical 1 to its logical 0 signal prior to the change of the local $RI_{SW}$ quantity from its logical 1 to its logical 0 signal to prevent AND network 82B from providing a logical 1 signal at its output. Similarly, at the remote end, the quantity $I_{SWN}$ should have a logical 0 signal prior to the quantity remote $RI_{SW}$ providing its logical 0 signal. A suitable current difference is 1.5 amperes.

It will now be apparent that under the described conditions, the current magnitude, absolute, at which the $I_{SWN}$ quantity changes from a logic 1 to a logic 0 signal should be 1.5 amperes (absolute less than the current magnitude (absolute) at which the $RI_{SW}$ quantity changes from its logical 1 to its logical 0 signal. Similarly, the current magnitude (absolute) at which the $I_{SWP}$ quantity changes from a logic 0 to a logic 1 signal should be 1.5 amperes (absolute) greater than the current magnitude (absolute) at which the $RI_{SW}$ quantity change from its logical 1 to its logical 0 signal.

Since as was pointed in connection with the fault conditions illustrated in FIG. 5, the magnitude of the current at which $I_{SWN}$ changes its logic signal is 3 amperes, the current magnitude at which the $RI_{SW}$ quantity changes its logic signal is 4.5 amperes and the current magnitude at which the $I_{SWP}$ quantity changes its logic signal is 6.0 amperes. The current margin used with the foregoing assumptions has upper and lower limits of 6 amperes and 3 amperes respectively and a keyer threshold limit of −4.5 amperes.

Using these values for the upper and lower limits of the current margin and for the keyer threshold limit, the offset keyer and squarer 67 functions in the following manner. A signal, representative of the current magnitude and polarity flowing in conductor 4, is fed to the offset keyer 67 via busses 62 and 63. As shown in FIG. 3, this signal is then fed to the non-inverting operational amplifiers 153 and 154, and to the inverting operational amplifier 155. THus, only the signal from amplifier 155 is inverted. Each of the operational amplifiers 153, 154 and 155 is directly coupled to level detectors 156, 157 and 158. The level detectors are adapted so that their output, which is normally a logical 1 goes to a logical 0 whenever the input level to its negative terminal exceeds that applied to its positive input terminal. In the case of level detector 156, the input resistors are chosen so that with the application of the current wave signal from amplifier 153, the output goes to a logical zero whenever the instantaneous value of the applied current signal exceeds 6 amperes. Since this result, as explained above, is logically opposite to the desired result, inverter 159 is utilized to logically invert the signal which appears on line 68 as $I_{SWP}$. The logic signals for $I_{SWN}$ and $I_{SW}$ are developed in a similar manner, except that there is no need to invert the output of limit detectors 157 and 158 which appear on lines 69 and 70 respectively.

The advantages of offset keying have been specifically explained in connection with a transmission line supplied at one end from a strong power source and at the other end from a weak power source with the load supplied from the weak source end resulting in an "outfeed". By no means is this the only power line condition which will produce a situation in which the prior art phase comparison of the current will not detect an internal fault. One example would be an internally faulted inductive power line having series connected power factor connecting capacitors. Under some possible conditions, the phasor of the primarily capacitive current flowing between one bus and the protected line section may be compared with the phasor of the primarily inductive current flowing between the other bus and the protected line section with the result that the fault current appears to be flowing completely through the protected line section rather than into the internal fault. The offset keying will, as described above, recognize the correct location of the fault and the phase comparison will be such as to provide the required tripping signal.

Application for U.S. patent Ser. No. 548,130, filed concurrently with this application in the name of Kalyan K. Mustaphi, discloses and claims a segregated phase comparing relaty in which the residual or ground current relaying network 23 and the phase current relaying network 20 are utilized for the detection of ground and phase to phase faults respectively. In the said Mustaphi application, the difference current of the conductors 4 and 5 is used to energize the phase current network 20 as illustrated in FIG. 10.

The current transformers 13 and 14 are connected to the two primary windings of isolating transformer 16A in opposition so that the output quantity of its secondary is the phase difference of the currents of lines 4 and 5. When this offset keying concept is applied to the concept of the said Mustaphi application, the magnitudes at which the $I_{SWP}$, $I_{SWN}$ and $RI_{SW}$ quantities change from a logical 0 to a logical 1 signal are determined as set out above and are based on a normal fault load of 5 amperes flowing in the secondary windings of the transformers 16A and 19. In the case of the transformer 16A, this 5 ampere value is more or less fictional since it would occur only when one only of its primary windings was energized.

Figure 10:
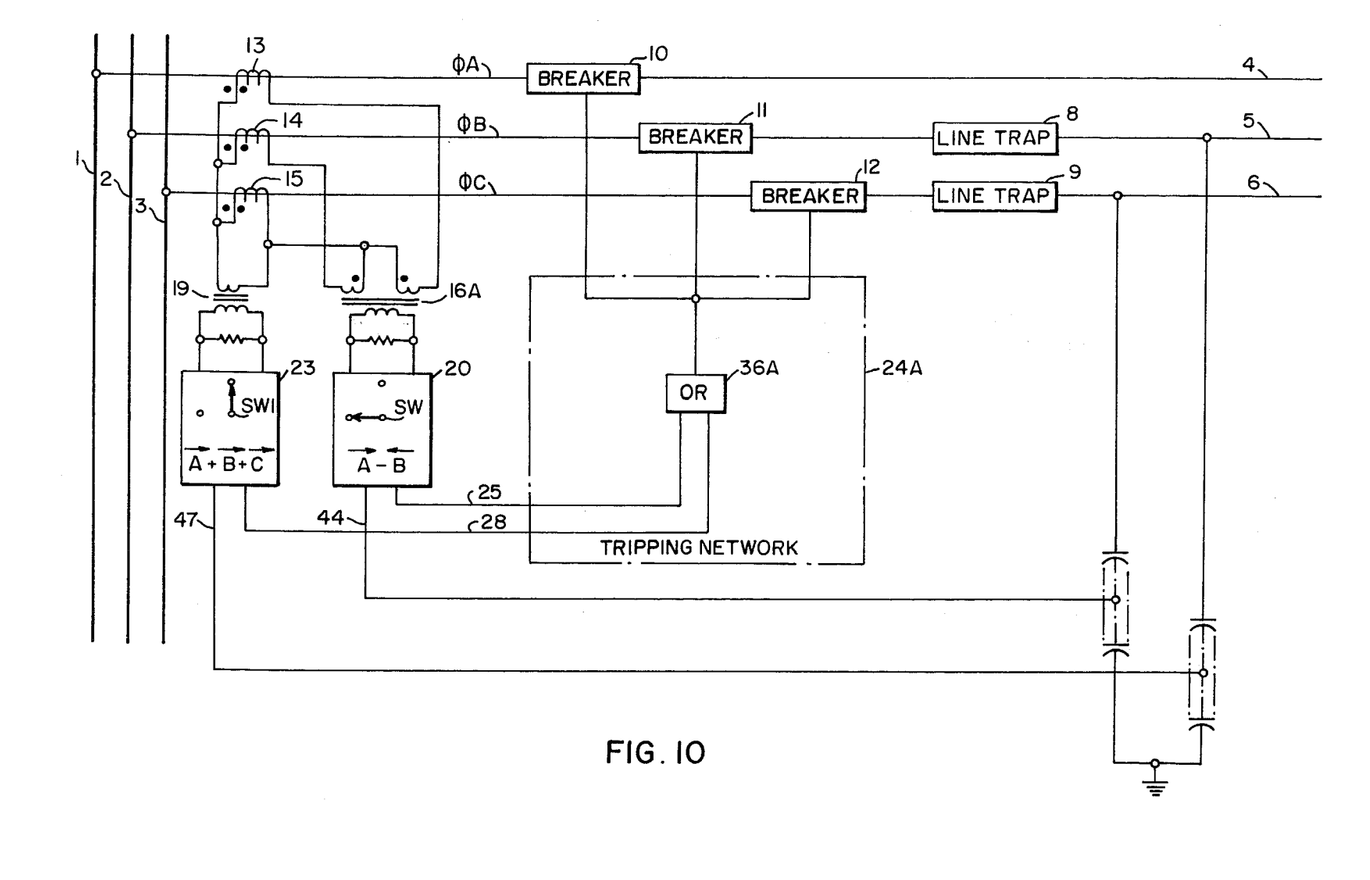

The arrangement of FIG. 10 does not lend itself to individual breaker operation and the tripping network 24A therefore includes only a single OR network 36A which has one of its two inputs connected to the outputs conductor 25 of the network 20 and the other of its two inputs connected to the output conductor 28 of the network 23. The single output of the OR network 36A is connected to trip all of the breakers 10, 11 and 12 upon the occurrence of a fault whether it is phase to phase or phase to ground.

What is claimed and is desired to be secured by United States Letters Patent is as follows:

1. Phase comparison relaying apparatus for an alternating current power transmission line including at least one conductor interconnecting first and second busses, said apparatus comprising:
 a. first means having first and second outputs adapted to receive a signal representative of the instantaneous magnitude of current flowing in the conductor, for establishing constant upper and lower limits of a current security margin, both of said limits being established to one side of the effective zero axis of the waveform of the received signal and for generating
   i. a first signal at both of its said outputs when the instantaneous magnitude of the received signal is between said upper and lower limits of said security margin,
   ii. a second signal at one of its said outputs when the instantaneous magnitude of the received signal is above said limits of said security margin, and
   iii. a third signal at the other of its said outputs when the instantaneous magnitude of the received signal is below said limits of said security margin; and
 b. second means, adapted to reeive the signal representative of the instantaneous magnitude of current flowing in the conductor, for establishing a constant keying threshold limit to the other side of the effective zero axis of the waveform of the received signal and for generating i. a first keying signal when the instantaneous magnitude of the received signal is above said keying threshold limit, and ii. a second keying signal when the instantaneous magnitude of the received signal is below said keying threshold limit.

2. The apparatus of claim 1 wherein the magnitude of said keying threshold limit is offset from the effective zero axis of the waveform of the received signal by an amount equal to the absolute magnitude of the value of maximum outflow current in the conductor as reflected in the received signal plus an operating safety margin.

3. The apparatus of claim 2 wherein the magnitude of said upper limit of said security margin is established as equal to the absolute value of said keyer threshold limit plus one-half of the absolute magnitude of the difference in magnitude between said limits of said security margin and the magnitude of said lower limit of said security margin is established as equal to the absolute value of said keyer threshold limit less one-half of the absolute magnitude of the difference in magnitude between said limits of said security margin.

4. The apparatus of claim 3 which additionally comprises:

a. third means, adapted to receive the signal representative of the instantaneous magnitude of current flowing in the conductor and operably coupled to receive said first and second keying signals, for transmitting said signals to a remote location whenever the conductor current exceeds a predetermined value; and b. fourth means, adapted to receive keying signals transmitted from a remote location and operably coupled to receive said first, second and third signals, for comparing said signals and any received keying signals from the remote location and for generating a trip signal employable in tripping a breaker adapted to protect the conductor whenever said first, second and third signals and any received keying signals from the remote location reach a predetermined relationship.

5. The apparatus of claim 2 wherein the magnitude of said upper limit of said security margin is established as equal to the absolute value of said keyer threshold limit plus one-half of the absolute magnitude of the difference in magnitude between said limits of said security margin and the magnitude of said lower limit of said security margin is established as equal to the absolute value of said keyer threshold limit less one-half of the absolute magnitude of the difference in magnitude between said limits of said security margin.

6. The apparatus of claim 1 wherein the magnitude of said upper limit of said security margin is established as equal to the absolute value of said keyer threshold limit plus one-half of the absolute magnitude of the difference in magnitude between said limits of said security margin and the magnitude of said lower limit of said security margin is established as equal to the absolute value of said keyer threshold limit less one-half of the absolute magnitude of the difference in magnitude between said limits of said security margin.

7. The apparatus of claim 6 which additionaly comprises:

a. third means, adapted to receive the signal representative of the instantaneous magnitude of current flowing in the conductor and operably coupled to receive said first and second keying signals, for transmitting said signals to a remote location whenever the conductor current exceeds a predetermined value; and b. fourth means, adapted to receive keying signals transmitted from a remote location and operably coupled to receive said first, second and third signals, for comparing said signals and any received keying signals from the remote location and for generating a trip signal employable in tripping a breaker adapted to protect the conductor whenever said first, second and third signals and any received keying signals from the remote location reach a predetermined relationship.

8. The apparatus of claim 1 which additionally comprises:

a. third means, adapted to receive the signal representative of the instantaneous magnitude of current flowing in the conductor and operably coupled to receive said first and second keying signals, for transmitting said signals to a remote location whenever the conductor current exceeds a predetermined value; and b. fourth means, adapted to receive keying signals transmitted from a remote location and operably coupled to receive said first, second and third signals, for comparing said signals and any received keying signals from the remote location and for generating a trip signal employable in tripping a breaker adapted to protect the conductor whenever said first, second and third signals and any received keying signals from the remote location reach a predetermined relationship.

* * * * *